United States Patent Office 3,455,449
Patented July 15, 1969

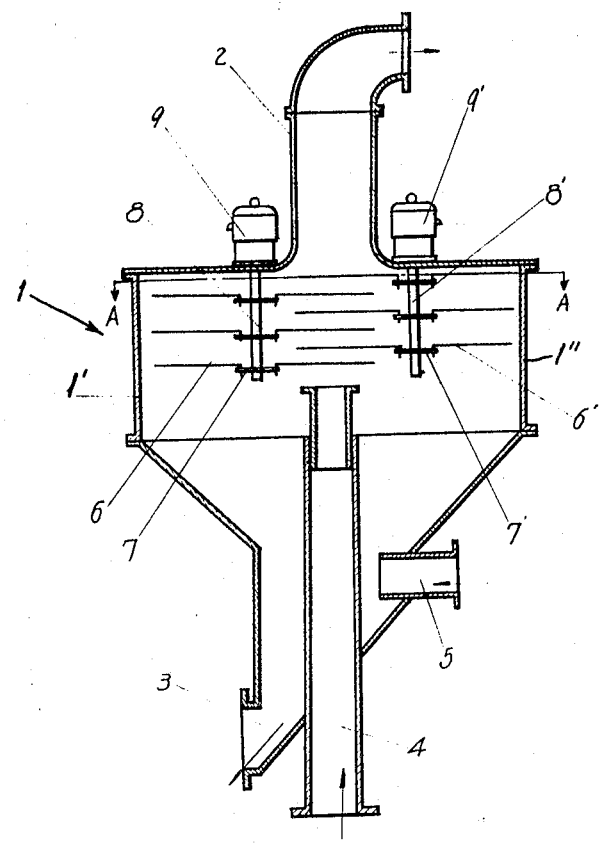
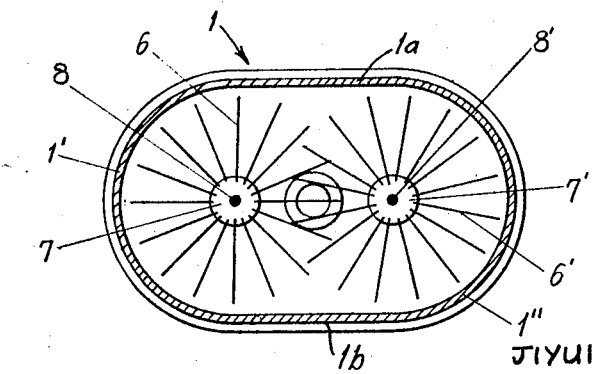

3,455,449
DEVICE HAVING ROTATING MEMBERS FOR SEPARATING POWDER INTO FINE AND COARSE PARTICLES
Jiyuichi Nara, 80 Samezucho, Ooi, Shinagawa-ku, Tokyo, Japan
Filed Feb. 24, 1967, Ser. No. 618,477
Int. Cl. B07b 7/083
U.S. Cl. 209—139     3 Claims

ABSTRACT OF THE DISCLOSURE

A powder separator is comprised of a housing having a discharge pipe for air mixed with fine particles of powder centrally located in its upper part which has a shape resembling an elliptical cylinder, an outlet for coarse particles of powder is located at the lower end of the lower part of the housing having an inverted and partly conical shape and a pipe for conveying air mixed with fine and coarse particles of powder extends upwardly within the housing from its lower end. Two vertically arranged horizontally spaced rotating shafts each having several horizontal discs equipped with a plurality of radially extending slender bars are arranged within the upper part of the housing to rotate in opposite directions with the bars on the opposite shafts being arranged in a vertically interleaved manner. Firstly, due to the shape of the upper part of the housing, it is made possible to prevent circular rotation of all air flow therein. Secondly, since the slender bars on each rotating shaft rotate in mutually opposite directions, it is made also possible to prevent circular rotation of all air flow therein.

In this construction, the mixture of fine and coarse particles of powder is entrained in the upwardly flowing air so that the impact action of the interleaved slender bars on the powder is made remarkably accurate directly above the opening of the blow-up pipe. The powder passing upwardly from the pipe strikes the slender bars until the coarse particles of powder are separated from the fine ones for their respective distribution. Thus, the separated particles are made precisely uniform in maximum size, thereby ensuring an excellent accuracy of separation mechanism. Moreover, in using this separator as a dryer no adhesion or conglomeration of powder particles occurs so that the drying efficiency is considerably improved.

Brief summary of the invention

The present invention relates to a powder separator. The basic object of the invention is to provide a powder separator capable of separating powder containing fine and coarse particles with high precision. Another object of the invention is to provide a powder separator which comprises a discharge pipe for air mixed with fine particles of powder being formed in the upper central part of an external drum or housing which has a shape resembling an oval or elliptical cylinder, an outlet for coarse particles of powder being formed at the lower end of the lower part of the housing which has an inverted partly conical portion, and a pipe for conveying air mixed with fine and coarse particles of powder extending upwardly from the lower end of the housing vertically extending, horizontally spaced rotating shafts, each having several horizontal extending, vertically spaced discs equipped with a plurality of radially extending slender bars are positioned within the upper part of the housing. The shafts are rotated in mutually opposite directions and as the slender bars on the shafts rotate they are arranged so that the bars on one shaft fit between the bars extending from a pair of discs on the other shaft in an interleaved manner.

Brief description of the drawings

FIG. 1 is a vertical sectional view of the powder separator according to the present invention. FIG. 2 is a plan view in cross section of the same separator, taken along the line A—A of FIG. 1.

Detailed description

One preferred embodiment of the invention will be explained in detail with reference to the accompanying drawings. In FIGS. 1 and 2, reference 1 indicates the external drum or housing which is formed in its upper part by a pair of spaced semi-cylindrical surfaces 1, 1" at both ends joined by a pair of rectilinear side members 1a, 1b which afford a somewhat oval or elliptical shape to the upper part. In the upper central region of the upper part there is provided a discharge pipe 2 for air mixed with fine particles of powder and at the bottom of the housing 1 is provided a discharge outlet 3 for coarse particles of powder respectively. Extending centrally upward from the lower part of external drum 1 is a pipe 4 for conveying air mixed with fine and coarse particles of powder into the upper part of the housing. A pipe 5 for blowing heated air into the housing is positioned in the lower part of the housing, as the case may require. Coaxial with the axis of each of the semi-cylindrical surfaces 1' and 1" are provided rotating shafts 8 and 8', each equipped with several horizontally arranged discs 7 and 7', respectively. The discs 7, 7' are arranged in an alternating spaced arrangement on the shafts 8, 8', respectively. Each of the discs 7, 7' has a plurality of horizontally disposed slender bars 6, 6' radially extending therefrom in such a manner that as the shafts rotate the slender bars extending from a disc on one shaft fit between and overalp the bars extending from a pair of discs on the other shaft in an interleaved arrangement.

The operation of the present powder separator will be carried out as follows.

Air mixed with fine and coarse particles of powder is blown up into the drum through pipe 4. The slender bars 6 and 6' on each rotating shaft are adapted to rotate in mutually opposite directions while they are fitted between each other directly above the outlet from the pipe 4.

Thus, the present powder separator is characterised by the construction that firstly, the external drum or housing 1 consists of two semi-cylindrical surfaces 1' and 1" interconnected by the rectilinear side members 1a, 1b and secondly, the slender bars 6 and 6' are caused to rotate in mutually opposite directions. Due to this construction the opposed rotating action and the interleaved arrangement of the slender bars 6 and 6' are arranged to reduce rotating air flow, that is circular rotation of all air flow in the same direction within the upper part of the housing 1 is prevented. Therefore, the alternatively arranged slender bars 6 and 6' rotating at a high rate of speed are permitted to impact the particles of powder uniformly as they ascend slowly from the upper end of the pipe 4. By predetermining the number and the rotational speed of said slender bars 6 and 6' so that said bars can be rotated faster and traverse the upward passage of the powder while it ascends the same distance as the diameter of slender bars 6 and 6', all the particles of powder can be struck at least once by said slender bars until the particles are separated one by one for final discharge. Thus the separated coarse particles of powder only are caused to descend in the drum 1 while the separated particles fine only can ascend therein for discharge from the discharge pipe 2, the coarse particles of powder being discharged from the outlet 3.

For concurrent use as a dryer, the present powder separator is sufficient by supplying heated air with the fine and coarse particles of powder through the pipe 4 or injecting hot air through pipe 5 whereby it is made possible to separate, collect, and dry the particles of powder at the same time.

According to the powder separator of the present invention, the rotation of air flow in one direction in the drum is reduced basically, firstly by the external drum 1 which is formed of a somewhat elliptical shape so that the circular rotation of all air flow can be prevented in the drum, and secondly, the slender bars 6 and 6' on each rotating shaft are adapted to rotate in mutually opposite directions so that the circular rotation of all air flow in one direction can also be prevented therein. Under these conditions, the powder consisting of fine and coarse particles is caused to flow in the upwardly flowing air so that the impact action of the slender bars on the particles of powder is made remarkably accurate. Moreover, the slender bars 6 and 6' extending from the spaced shafts 8, are adapted to intersect or fit between each other above the opening of the pipe 4 conveying the air mixed with fine and coarse particles of powder and the discharge pipe 2 for air mixed with fine separated particles of powder is arranged in such as manner that the particles of powder discharged upwardly from the pipe 4 are struck by the slender bars 6 and 6' until the fine particles can be separated from the coarse ones. The particles of powder thus separated by the present separator are made exactly uniform in size, the accuracy of separation is considerably increased, and moreover, when the present separator is used concurrently as a dryer, no adhesing adhesive or conglomerated particles result therefrom thus ensuring satisfactory drying efficiency simultaneously.

What is claimed is:

1. A device for separating fine and coarse particles in a powder mixture comprising a vertically extending housing having an upper part and a lower part, said upper part having an elliptically-like shaped transverse section and having an outlet from its upper end, said lower part converging downwardly from said upper part and forming an outlet therefrom at its lower end, a pipe extending upwardly from the lower end of said housing and having an outlet in the upper part thereof for supplying an air borne powder mixture thereto, a pair of vertically extending horizontally spaced shafts being disposed on diametrically opposite sides of said pipe, means for rotating said shafts in opposite directions, a plurality of slender bars extending radially outward from each of said shafts in several planes transverse to the axis of said shafts, the planes of said bar on said shafts arranged in alternating spaced relationship, said bars on each of said shafts being arranged, as said shafts rotate, to extend radially outwardly in alignment above the upper end of said pipe and with at least one plane of said bars of one said shaft being arranged to fit in interleaved arrangement between two planes of said bars on the other said shaft whereby said bars on said shafts alternately impact against the powder mixture discharged from the upper end of said pipe and separate the powder mixture into its fine and coarse particles with the fine particles passing upwardly from the bars mixed with air and being discharged from the outlet in the upper end of said upper part and the coarse particles being discharged downwardly into said lower part being discharged from the outlet at the lower end thereof.

2. A device as set forth in claim 2, wherein said upper part of said housing comprises a pair of oppositely spaced semi-cylindrically shaped end surfaces interconnected by a pair of rectilinear side members.

3. A device as set forth in claim 3, wherein a plurality of horizontally arranged discs are positioned on each of said shafts, said discs disposed in an alternately vertically spaced arrangement, and a plurality of uniformly circumferentially spaced said bars being secured to each of said discs.

References Cited

UNITED STATES PATENTS

| | | | |
|---|---|---|---|
| 3,233,836 | 2/1966 | Merges | 209—3 X |
| 3,308,945 | 3/1967 | Oja | 209—3 |

FOREIGN PATENTS 535,314   10/1931   Germany.

FRANK W. LUTTER, Primary Examiner

U.S. Cl. X.R.

209—11